United States Patent
Stebnicki et al.

(10) Patent No.: US 7,527,146 B2
(45) Date of Patent: May 5, 2009

(54) CONVEYOR MODULE WITH A SNAP FIT EXTENSION FOR SUPPORTING A ROLLER

(75) Inventors: James C. Stebnicki, Glendale, WI (US); Kevin S. Hansen, Grafton, WI (US)

(73) Assignee: Rexnord Industries, LLC, Milwaukee, WI (US)

( * ) Notice: Subject to any disclaimer, the term of this patent is extended or adjusted under 35 U.S.C. 154(b) by 32 days.

(21) Appl. No.: 11/397,477

(22) Filed: Apr. 4, 2006

(65) Prior Publication Data

US 2007/0227861 A1    Oct. 4, 2007

(51) Int. Cl.
*B65G 17/38* (2006.01)

(52) U.S. Cl. .................. 198/853; 198/850; 198/851; 198/852

(58) Field of Classification Search .......... 198/845–853
See application file for complete search history.

(56) References Cited

U.S. PATENT DOCUMENTS

| | | | |
|---|---|---|---|
| 3,674,130 A | | 7/1972 | Carmichael |
| 5,042,244 A | * | 8/1991 | Worsley ................... 59/78 |
| 5,224,583 A | | 7/1993 | Palmaer et al. |
| 5,755,480 A | * | 5/1998 | Bryan ................. 296/26.01 |
| 6,223,889 B1 | * | 5/2001 | Layne et al. ............... 198/853 |
| 6,364,095 B1 | | 4/2002 | Layne et al. |
| 6,367,616 B1 | * | 4/2002 | Lapeyre et al. ............ 198/779 |
| 6,398,015 B1 | | 6/2002 | Sedlacek et al. |
| 6,494,312 B2 | | 12/2002 | Costanzo |
| 6,585,110 B2 | | 7/2003 | Layne et al. |
| 6,932,211 B2 | | 8/2005 | Wietina et al. |

FOREIGN PATENT DOCUMENTS

| | | |
|---|---|---|
| EP | 1120367 A1 | 8/2001 |
| WO | 01/79085 A1 | 10/2001 |
| WO | 2005/061350 A | 7/2005 |

\* cited by examiner

*Primary Examiner*—Gene Crawford
*Assistant Examiner*—Leslie A Nicholson, III
(74) *Attorney, Agent, or Firm*—Quarles & Brady LLP

(57) ABSTRACT

A conveyor assembly includes a module which can support a roller between adjacent hinge members to simplify modular conveyor assembly and disassembly. The module includes at least two adjacent first hinge members extending in a direction of conveyor travel and defining a space therebetween. The at least two adjacent first hinge members include coaxial openings for receiving a hinge pin therethrough. A first snap fit extension extending from at least one of the adjacent first hinge members toward the other of the adjacent first hinge members for holding a roller in the space substantially coaxial with the openings in the at least two adjacent first hinge members.

17 Claims, 5 Drawing Sheets

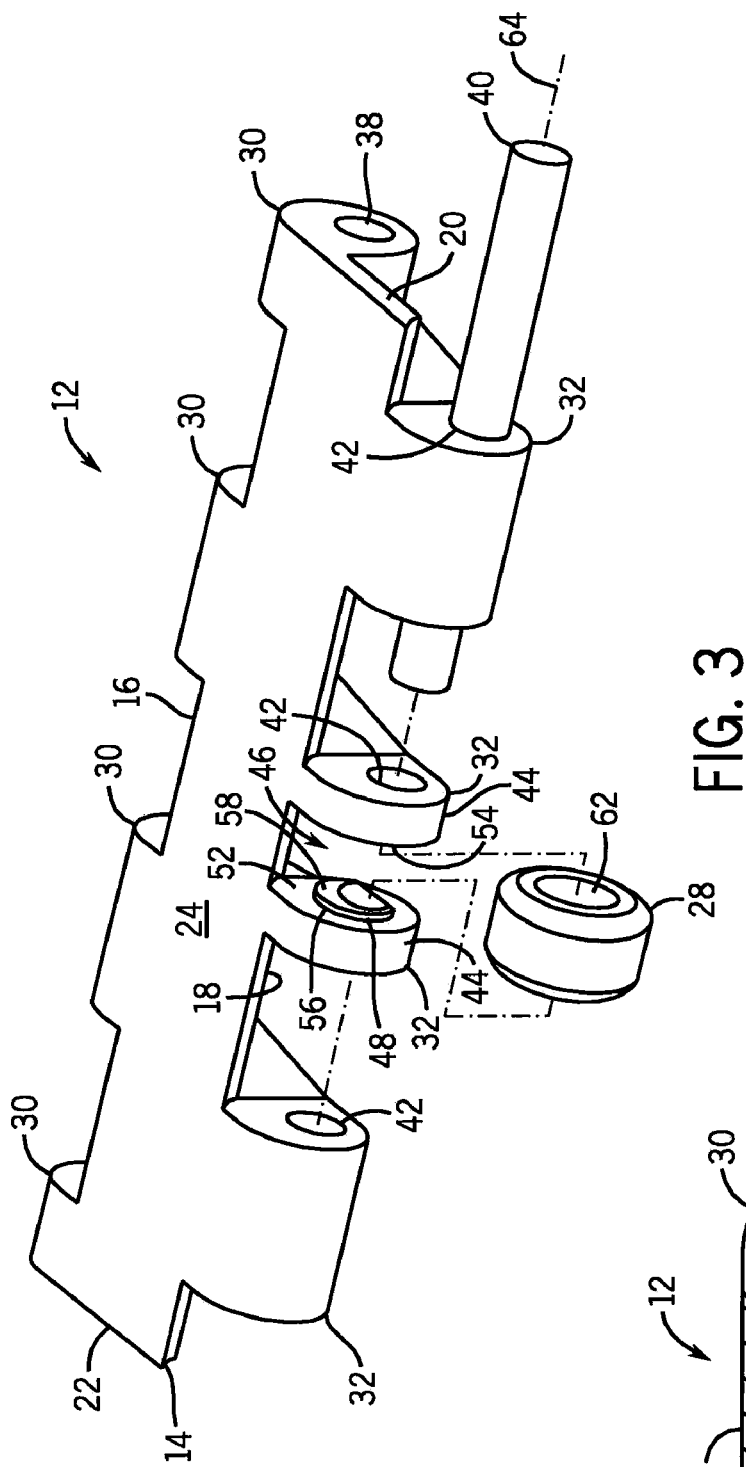
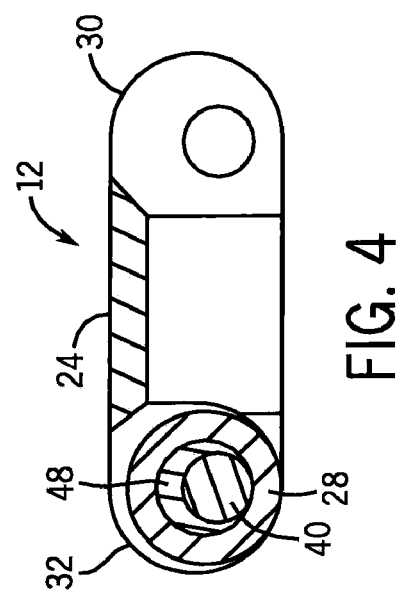
FIG. 3
FIG. 4

CONVEYOR MODULE WITH A SNAP FIT EXTENSION FOR SUPPORTING A ROLLER

CROSS REFERENCES TO RELATED APPLICATIONS

Not Applicable.

STATEMENT REGARDING FEDERALLY SPONSORED RESEARCH

Not Applicable.

BACKGROUND OF THE INVENTION

The present invention relates to modular conveyor belts and chains, and more particularly to a conveyor module which can support rollers and a modular conveying assembly including at least one of the conveyor modules.

Modular belting and chains are formed from interconnected modules that are supported by a frame and driven to transport a product. Each module has a support surface which supports the product as the belting or chain is being driven along the frame. Adjacent modules are connected to each other by hinge pins inserted through hinge members extending from adjacent modules in the direction of the belt travel. Roller are often incorporated into modular belts to reduce friction between the belt and frame or reduce back line pressure on the conveyed product. Incorporating the roller into the belt has taken different forms.

One known solution for reducing back-line pressure is disclosed in U.S. Pat. No. 4,231,469 issued to Arscott. In Arscott, rollers are supported by roller cradles between modules. The rollers extend above the cradle for rolling contact with an object being conveyed independent of the location of the hinge pins. The rollers reduce friction between the belt and the object. Unfortunately, assembling the roller in the cradle is difficult, requiring insertion of the roller into the cradle, and then slipping an axle or two stub axles through holes formed through the cradle walls and into the roller. The axle must then be secured to prevent it from slipping out of one of the holes formed in the cradle wall. This particular solution has many parts and is difficult to assemble.

Another known solution to this problem is to rotatably mount rollers directly on the hinge pin connecting modules together, such that the hinge pin supports the rollers between adjacent hinge members. The roller rotates about an axis of rotation that is substantially coaxial with the hinge pin axis. Assembling a modular conveyor including modules having a pin supported roller between adjacent hinge members is labor intensive. Each individual roller must be held between the adjacent hinge members as the hinge pin is fed through the coaxial openings in the hinge members and rollers. Moreover, when the modular conveyor is disassembled, once the hinge pin is removed, the rollers tend to fall away and are lost, or worse cause a loss of time, mechanical damage, or product contamination. A need exists for a conveyor module which can support a roller between adjacent hinge members without a hinge pin to simplify modular conveyor assembly and disassembly.

SUMMARY OF THE INVENTION

The present invention provides a conveyor assembly including a conveyor module which can support a roller between adjacent hinge members to simplify modular conveyor assembly and disassembly. The module includes at least two adjacent first hinge members extending in a direction of conveyor travel and defining a space therebetween. The at least two adjacent first hinge members include coaxial openings for receiving a hinge pin therethrough. A first snap fit extension extending from at least one of the adjacent first hinge members toward the other of the adjacent first hinge members for holding a roller in the space substantially coaxial with the openings in the at least two adjacent first hinge members.

A general objective of the present invention is to provide a belt module and a modular conveying assembly formed therefrom that can support a roller between adjacent hinge members without a hinge pin. This objective is accomplished by providing a beveled stub extending from at least one hinge member toward an adjacent hinge member of the same module.

This and still other objectives and advantages of the present invention will be apparent from the description which follows. In the detailed description below, preferred embodiments of the invention will be described in reference to the accompanying drawing. These embodiments do not represent the full scope of the invention. Rather the invention may be employed in other embodiments. Reference should therefore be made to the claims herein for interpreting the breadth of the invention.

BRIEF DESCRIPTION OF THE DRAWINGS

FIG. 3 is an exploded perspective view of a module of FIG. 2;

FIG. 4 is a sectional view along line 4-4 of FIG. 2;

DETAILED DESCRIPTION OF PREFERRED EMBODIMENTS

Figure 1:
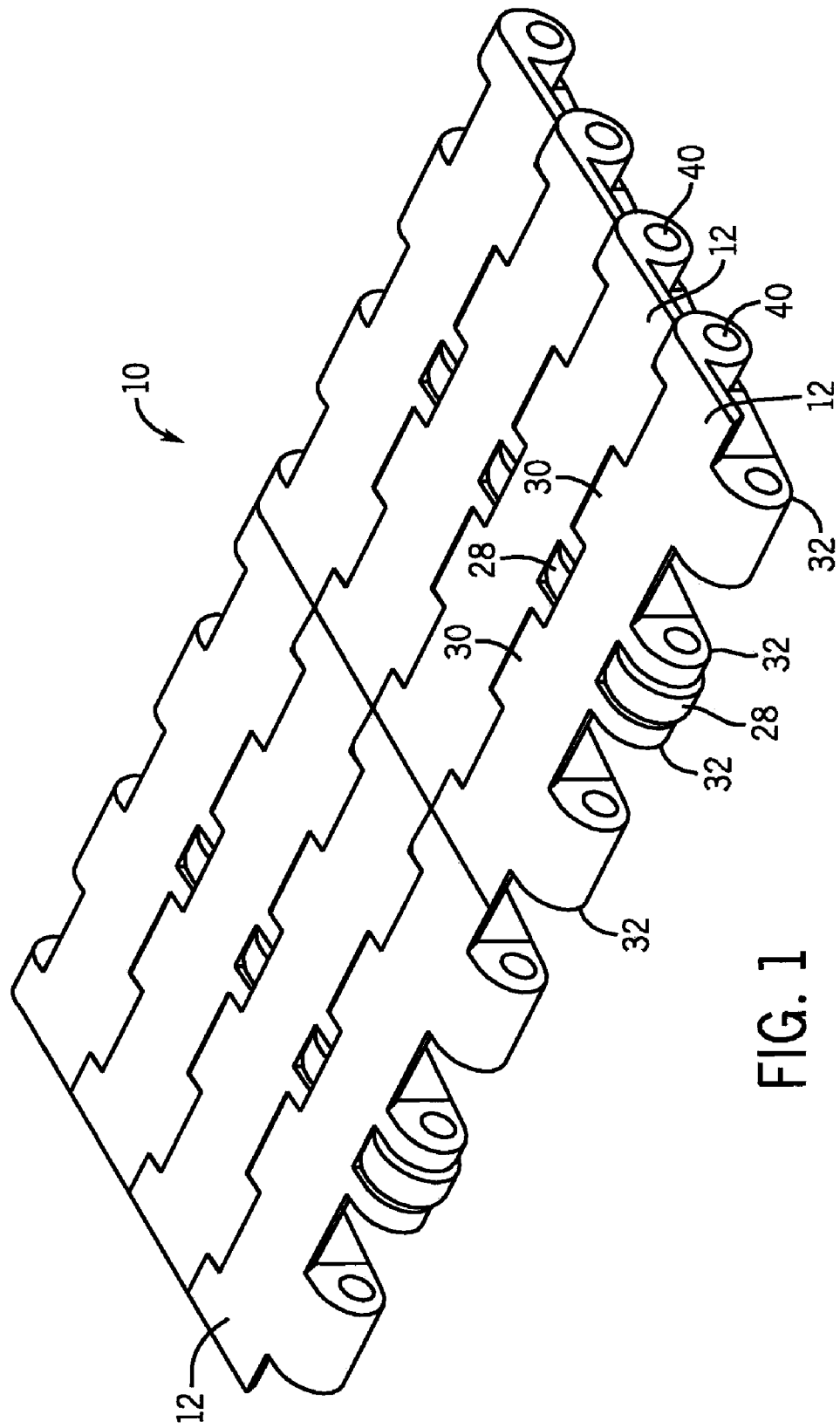
FIG. 1 is a perspective view of a modular conveyor belt incorporating the present invention.
Figure 2:
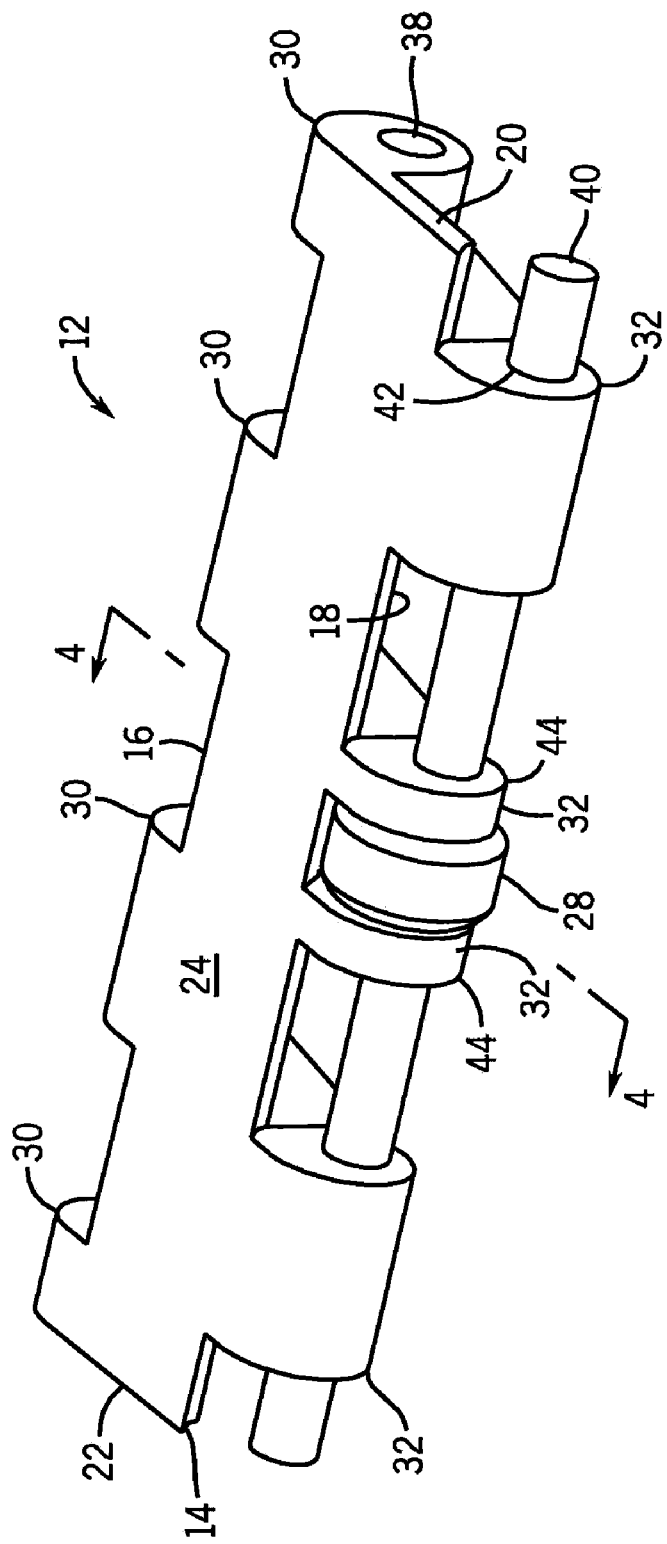
FIG. 2 is a perspective view of a modular conveyor belt module shown in FIG. 1.

A conveying assembly or belt 10 incorporating the present invention shown in FIG. 1 includes a plurality of belt modules 12. The belt modules 12 are assembled in an edge to edge relation to form the continuous belt 10. Hinge pins 40 join laterally adjacent modules 12 and pivotally connect other adjacent modules 12 in the direction of belt travel. In-line rollers 28 encircling the hinge pins 40 reduce friction between the belt 10 and a carry bed or sliding surface of a conveyor support frame. Although, the terms "leading" and "trailing" are used to identify features of the module 12, the module 12 described herein can be used in any direction, or orientation without departing from the scope of the invention.

The modules 12 are preferably formed using methods known in the art, such as injection molding, from materials known in the art, such as acetal, polyethylene, polypropylene, nylon, and the like. As shown in FIGS. 1-4, each module 12 includes a body 14 having a top surface 24 surrounded by a leading edge 16 and trailing edge 18 joined by a first side edge 20 and a second side edge 22. Advantageously, the top surface 24 can prevent products from falling through the belt 10. Of course, the top surface 24 can also have perforations to allow air or fluid flow for cooling, drafting, and/or draining. The module body 14 has a width which is defined by the distance between the side edges 20, 22, and a length which is defined by the distance between the leading and trailing edges 16, 18.

Leading edge hinge members 30 extend forwardly from the leading edge 16 of the module body 14. Each of the leading edge hinge members 30 on the module 12 include a coaxial leading edge hinge pin opening 38 for receiving the hinge pin 40 pivotally connecting the leading edge hinge members 30 of one module 12 to trailing edge hinge members 32 of an upstream module 12.

Trailing edge hinge members 32 extending rearwardly from the trailing edge 18 also include coaxial trailing edge hinge pin openings 42. The trailing edge hinge pin openings 42 receive the hinge pin 40 pivotally connecting the trailing edge hinge members 32 of the module 12 to leading edge hinge members 30 of a downstream module 12. In the embodiment disclosed herein, a pair 44 of adjacent trailing edge hinge members 32 on the module 12 define a space 46 therebetween for receiving one of the in-line rollers 28. Although a single pair 44 of adjacent trailing edge hinge members 32 receiving an in-line roller 28 is described, the module 12 can include two or more pairs 44 of adjacent hinge members for receiving rollers therebetween without departing from the scope of the invention.

A snap fit extension 48 extending from an inner face 52 of one of the trailing edge hinge members 32 of the pair 44 of adjacent trailing edge hinge members 32 extends toward an opposing inner face 54 of the other of the trailing edge hinge member 32 of the pair 44 of adjacent trailing edge hinge members 32. In the embodiment shown in FIGS. 1-4, the crescent-shaped snap fit extension 48 extends axially from a proximal end 56 at the inner face 52 toward a distal end 58, and is coaxial with the trailing edge hinge member opening 42. The distal end 58 of the snap fit extension 48 is spaced a distance from the opposing inner face 54 of the other of the trailing edge hinge member 32 of the pair 44 of adjacent trailing edge hinge members 32. Although the distal end 58 of the snap fit extension 48 is shown in FIG. 1 to be substantially perpendicular to the hinge pin axis 64, the distal end 58 can define an angle with the hinge pin axis 64 to facilitate insertion of the roller 28 into the space 46 without departing from the scope of the invention. For example, an upper portion of the distal end 58 can extend further from the inner face 52 than a lower portion to form an angled distal end 58 which facilitates inserting the roller 28 into the space 46 from beneath the module 12.

Each roller 28 received in the space 46 between the pair 44 of adjacent trailing edge hinge members 32 is substantially cylindrical having a center hole 62 through which the hinge pin 40 extends. The snap fit extension 48 extends into the center hole 62 to hold the roller 28 in the space 46 substantially coaxial with the trailing edge hinge pin openings 42 for insertion of the hinge pin 40 therethrough. Preferably, the roller 28 has a width greater than the distance between the distal end 58 of the snap fit extension 48 and the opposing inner face 54 of the other of the trailing edge hinge member 32 of the pair 44 of adjacent trailing edge hinge members 32, such that the snap fit extension 48 snaps into the center hole 62 once the center hole 62 is substantially aligned with the trailing edge hinge pin openings 42.

The rollers 28 extend below the module to reduce friction between the module 12 and the carry bed or sliding surface of the conveyor support frame. Preferably, the roller 28 is molded from a plastic and includes a center hole 62 formed therethrough for receiving the hinge pin 40 and snap fit extension 48. Advantageously, the roller 28 rotates around the hinge pin 40 to minimize friction between the belt 10 and the carry bed or sliding surface of the conveyor support frame.

Although a plastic roller 28 is disclosed, the roller 28 can be formed from any material, such as elastomers, metals, and the like, suitable for the particular application without departing from the scope of the invention. Moreover, although a roller 28 extending below the module 12 is shown, the trailing edge hinge pin openings 42 or snap fit extensions 48 can be located relative to the module top surface 24, such that the roller 28 extends above the module 12 to support an object being conveyed by the belt 10 and allow movement of the object in the direction of conveyor travel to reduce back-line pressure without departing from the scope of the invention.

The module 12 is assembled by urging a roller 28 between the pair 44 of adjacent trailing edge hinge members 32 and engaging the roller 28 with the snap fit extension 48. The snap fit extension 48 is urged between the pair 44 of adjacent trailing edge hinge members 32 until the snap fit extension 48 snaps into the center hole 62 of the roller 28 to hold the roller 28 between the pair 44 of adjacent trailing edge hinge members 32 aligned with the coaxial openings 42. Urging the roller 28 between the pair 44 of adjacent tailing hinge members 32 and engaging the roller 28 with the snap fit extension 48 deforms at least one of the trailing edge hinge members 32 and roller 28 which causes the snap fit extension 48 to snap into the roller center hole 62 once the roller center hole 62 is substantially aligned with the snap fit extension 48 and trailing edge hinge pin openings 50.

Once the rollers 28 are in place in a plurality of modules 12, the belt 10 is assembled by intermeshing the trailing edge hinge members 32 of one of the modules 12 with the leading edge hinge members 30 of an adjacent module 12, such that the pair 44 of trailing edge hinge members 32 and roller 28 of the one module 12 are received between a pair of leading edge hinge members 30 of the other module 12 and the trailing edge hinge member openings 42 of the one module 12 are aligned with and the leading edge hinge member openings 38 of the other module 12. A hinge pin 40 is then inserted through the aligned hinge member openings 38, 42 and roller center hole 62 to pivotally link the adjacent modules 12 together.

Figure 5:
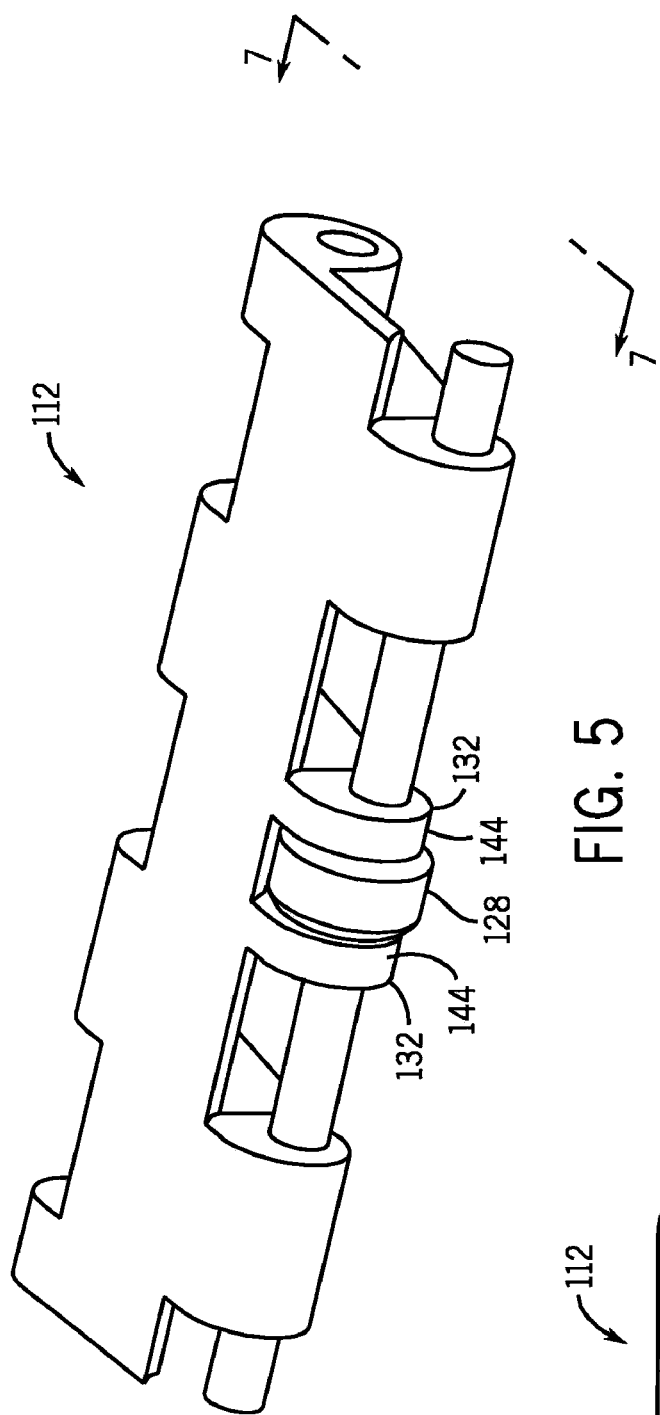
FIG. 5 is a perspective view of another modular conveyor belt module incorporating the present invention.
Figure 7:
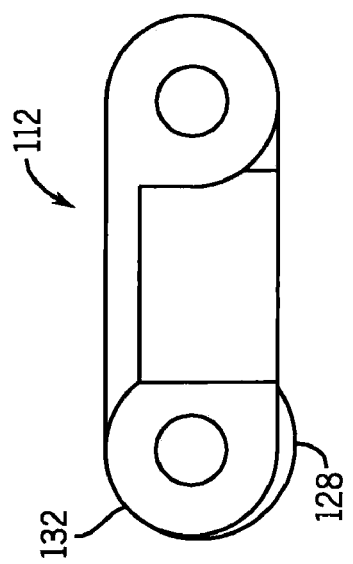
FIG. 7 is a side edge view along line 7-7 of FIG. 5.
Figure 6:
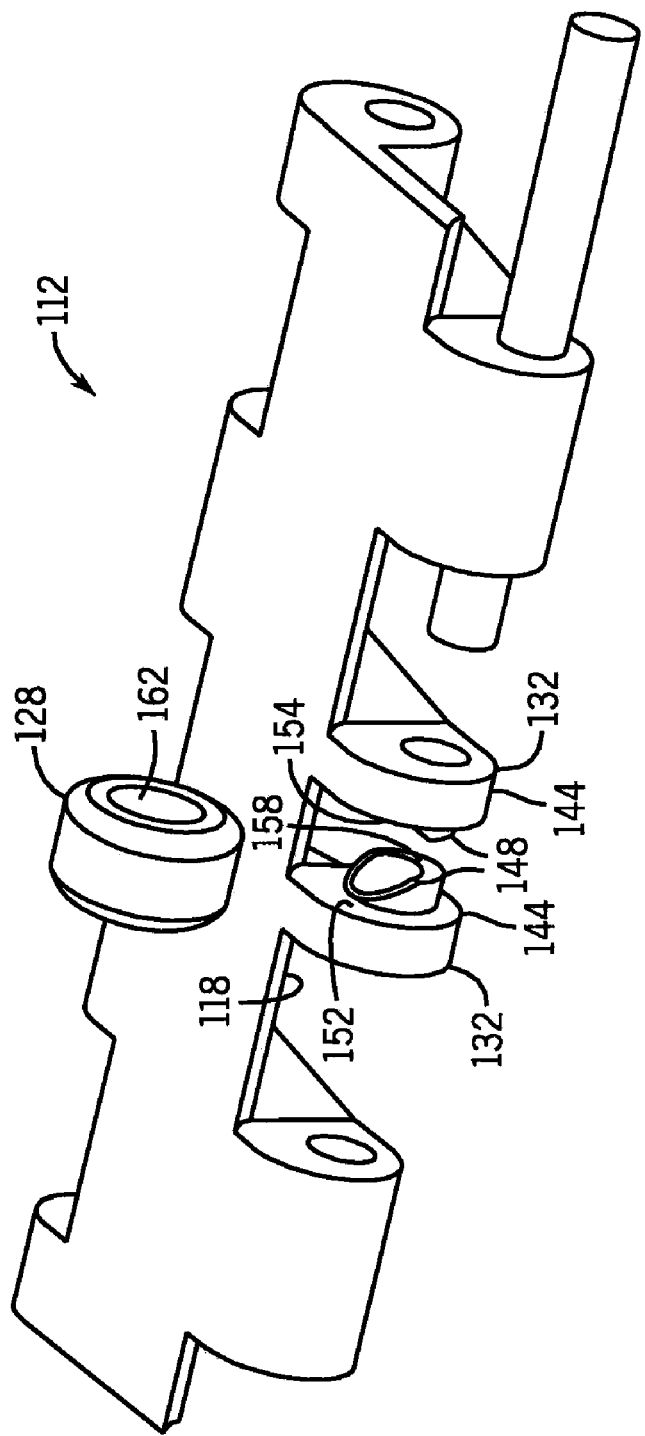
FIG. 6 is an exploded perspective view of a module of FIG. 5.

As shown in FIGS. 5-7, another module 112 incorporating the present invention is substantially identical to the module 12 described above having a pair 144 of adjacent trailing edge hinge members 132 extending from a trailing edge 118 of the module 112. In this embodiment, each opposing inner surface 152, 154 of the adjacent trailing edge hinge members 132 includes an axially extending snap fit extension 148. The snap fit extensions 148 extend toward each other having distal ends 158 defining a distance therebetween. Each of the snap fit extension distal ends 158 are chamfered to facilitate inserting a roller 28 therebetween from above the module 12.

Advantageously, in this embodiment two or more rollers 128 can be received between the pair 144 of adjacent trailing edge hinge members 132. Preferably, in this embodiment each roller 128 received between the adjacent trailing edge hinge members 132 has a width greater than the distance between the distal ends 158 of the snap fit extensions 148, such that at least one of the snap fit extensions 148 snaps into the center hole 162 of the roller 128 once the roller 128 is substantially aligned with the trailing edge hinge pin openings 150.

While there has been shown and described what are at present considered the preferred embodiments of the invention, it will be obvious to those skilled in the art that various changes and modifications can be made therein without departing from the scope of the invention defined by the appended claims.

We claim:

1. A conveyor belt module for use in a modular conveying assembly, said module comprising:
   at least two adjacent first hinge members extending in a direction of conveyor travel and defining a space therebetween, said at least two adjacent first hinge members including coaxial openings for receiving a first hinge pin therethrough;
   at least one second hinge member extending in a direction opposite of conveyor travel, said at least one second binge member being offset from said at least two adjacent first hinge members and including an opening for receiving a second binge pin therethrough; and
   a first snap fit extension extending from at least one of said adjacent first hinge members toward the other of said adjacent first hinge members for holding a roller in said space substantially coaxial with said openings in said at least two adjacent first hinge members.

2. The conveyor belt module as in claim 1, including a roller having a center hole and a width greater than a distance defined between a distal end of said snap fit extension and said other of said adjacent first hinge member, said roller receiving said snap fit extension in said center hole.

3. The conveyor belt module as in claim 2, in which said roller extends above the module.

4. The conveyor belt module as in claim 2, in which said roller extends below the module.

5. The conveyor belt module as in claim 1, in which said conveyor module includes a top surface defined by a leading edge and a trailing edge joined by side edges, and said first hinge members extends rearwardly from said trailing edge.

6. The conveyor belt module as in claim 1, in which a second snap fit extension extends from the other of said adjacent first hinge members toward said first snap fit extension.

7. The conveyor belt module as in claim 6, including a roller having a center hole and width greater than a distance defined between a distal end of said first snap fit extension and a distal end of said second snap fit extension, said roller receiving at least one of said first and second snap fit extensions in said center hole.

8. The conveyor belt module as in claim 1, in which said first snap fit extension includes a proximal end fixed to said first hinge member and a chamfered distal end.

9. A conveyor assembly comprising a conveyor belt module as claimed in claim 1.

10. A modular conveying assembly comprising:
    a first conveyor module having at least two adjacent first hinge members extending in a direction of conveyor travel and defining a space therebetween, said at least two adjacent first hinge members including coaxial openings for receiving a first hinge pin therethrough, at least one second hinge member extending in a direction opposite of conveyor travel, said at least one second hinge member being offset from said at least two adjacent first hinge members and including an opening for receiving a second hinge pin therethrough, a first snap fit extension extending from at least one of said adjacent first hinge members toward the other of said adjacent first hinge members, a roller having a center hole substantially aligned with said coaxial opening and receiving said first snap fit extension;
    a second conveyor module having a pair of adjacent second hinge members receiving said first hinge members therebetween, said pair of adjacent second hinge members including coaxial openings for receiving said first hinge pin; and
    a first hinge pin extending through said coaxial openings of said first and second hinge members and said center hole.

11. The conveyor assembly as in claim 10, in which said a roller has a width greater than a distance defined between a distal end of said snap fit extension and said other of said adjacent first hinge member, said roller receiving said snap fit extension in said center hole.

12. The conveyor assembly as in claim 10, in which said roller extends above the first conveyor module.

13. The conveyor assembly as in claim 10, in which said roller extends below the first conveyor module.

14. The conveyor assembly as in claim 10, in which said first conveyor module includes a top surface defined by a leading edge and a trailing edge joined by side edges, and second hinge members extend forwardly from said leading edge, and said first hinge members extend rearwardly from said trailing edge.

15. The conveyor assembly as in claim 10, in which a second snap fit extension extends from the other of said adjacent first hinge members toward said first snap fit extension.

16. The conveyor assembly as in claim 15, in which said roller has a width greater than a distance defined between a distal end of said first snap fit extension and a distal end of said second snap fit extension, said roller receiving at least one of said first and second snap fit extensions in said center hole.

17. The conveyor assembly as in claim 10, in which said first snap fit extension includes a proximal end fixed to said first hinge member and a chamfered distal end.

* * * * *

UNITED STATES PATENT AND TRADEMARK OFFICE
CERTIFICATE OF CORRECTION

| | | |
|---|---|---|
| PATENT NO. | : 7,527,146 B2 | Page 1 of 1 |
| APPLICATION NO. | : 11/397477 | |
| DATED | : May 5, 2009 | |
| INVENTOR(S) | : Stebnicki et al. | |

It is certified that error appears in the above-identified patent and that said Letters Patent is hereby corrected as shown below:

Column 5, lines 11 and 13 "binge" should be changed to -- hinge --

Signed and Sealed this

Twenty-first Day of July, 2009

JOHN DOLL
*Acting Director of the United States Patent and Trademark Office*